(12) United States Patent
Hartman et al.

(10) Patent No.: US 9,621,265 B2
(45) Date of Patent: Apr. 11, 2017

(54) STREET LIGHTING CONTROL, MONITORING, AND DATA TRANSPORTATION SYSTEM AND METHOD

(71) Applicant: GENERAL ELECTRIC COMPANY, Schenectady, NY (US)

(72) Inventors: Michael James Hartman, Clifton Park, NY (US); Bruce Gordon Barnett, Niskayuna, NY (US); John Erik Hershey, Ballston, NY (US); Michael Joseph Dell'Anno, Niskayuna, NY (US); Stanislava Soro, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/546,916

(22) Filed: Nov. 18, 2014

(65) Prior Publication Data

US 2015/0147064 A1 May 28, 2015

Related U.S. Application Data

(60) Provisional application No. 61/907,090, filed on Nov. 21, 2013, provisional application No. 61/907,078, (Continued)

(51) Int. Cl.
*H04B 10/112* (2013.01)
*H05B 37/02* (2006.01)
(Continued)

(52) U.S. Cl.
CPC ......... *H04B 10/1129* (2013.01); *G08C 23/04* (2013.01); *H04Q 9/00* (2013.01);
(Continued)

(58) Field of Classification Search
CPC ... H04B 10/11–10/116; H04B 37/0272; H04B 37/034; G08C 23/04; Y02B 20/72
See application file for complete search history.

(56) References Cited

U.S. PATENT DOCUMENTS 4,704,610 A 11/1987 Smith et al.
4,878,754 A 11/1989 Homma et al.
(Continued)

FOREIGN PATENT DOCUMENTS

EP 1437270 A1 7/2004
EP 2131630 A2 12/2009
(Continued)

OTHER PUBLICATIONS

U.S. Appl. No. 14/543,892, filed Nov. 18, 2014, Hershey et al.
(Continued)

*Primary Examiner* — David Payne
*Assistant Examiner* — Casey Kretzer
(74) *Attorney, Agent, or Firm* — Pabitra K. Chakrabarti

(57) ABSTRACT

A method and system for controlling and monitoring street lights using optical link signaling through free space which does not require an FCC license for operation. The optical link signaling is accomplished in the space between street lights by using LEDs for both area lighting and optical signaling. A Street lighting system luminaire comprises a structural member such as a pole, a lamp comprising one or more LEDs, and an optical receiver that receives optical signaling from one or more other luminaires in street lighting network. The modulator modulates the output of the lamp to launch data into the street lighting system for transport. The optical receiver and modulator enables strobing and flashing modes such as required to support emergency services.

8 Claims, 6 Drawing Sheets

Related U.S. Application Data filed on Nov. 21, 2013, provisional application No. 61/907,069, filed on Nov. 21, 2013, provisional application No. 61/907,114, filed on Nov. 21, 2013, provisional application No. 61/907,133, filed on Nov. 21, 2013, provisional application No. 61/907,150, filed on Nov. 21, 2013, provisional application No. 61/907,168, filed on Nov. 21, 2013, provisional application No. 61/907,188, filed on Nov. 21, 2013, provisional application No. 61/907,210, filed on Nov. 21, 2013.

(51) Int. Cl.
*G08C 19/22* (2006.01)
*G08C 23/04* (2006.01)
*H05B 37/03* (2006.01)
*H04Q 9/00* (2006.01)

(52) U.S. Cl.
CPC ....... *H05B 37/0272* (2013.01); *H05B 37/034* (2013.01); *G08C 2201/93* (2013.01); *H04Q 2209/40* (2013.01); *Y02B 20/72* (2013.01)

(56) References Cited

U.S. PATENT DOCUMENTS

| | | |
|---|---|---|
| 5,014,052 A | 5/1991 | Obeck |
| 5,028,129 A | 7/1991 | Smith |
| 5,199,044 A | 3/1993 | Takeuchi et al. |
| 5,243,185 A | 9/1993 | Blackwood |
| 5,345,232 A | 9/1994 | Robertson |
| 5,519,692 A | 5/1996 | Hershey et al. |
| 5,519,725 A | 5/1996 | Hershey et al. |
| 5,526,357 A | 6/1996 | Jandrell |
| 5,557,261 A | 9/1996 | Barbour |
| 5,563,728 A * | 10/1996 | Allen .................... H04B 10/40 398/126 |
| 5,563,906 A | 10/1996 | Hershey et al. |
| 5,568,507 A | 10/1996 | Hershey et al. |
| 5,568,508 A | 10/1996 | Hershey |
| 5,568,509 A | 10/1996 | Hershey et al. |
| 5,568,522 A | 10/1996 | Hershey et al. |
| 5,682,100 A | 10/1997 | Rossi et al. |
| 5,761,238 A | 6/1998 | Ross et al. |
| 5,822,099 A * | 10/1998 | Takamatsu ......... H04B 10/1127 398/107 |
| 5,844,949 A | 12/1998 | Hershey et al. |
| 5,852,243 A | 12/1998 | Chang et al. |
| 5,903,594 A | 5/1999 | Saulnier et al. |
| 6,011,508 A | 1/2000 | Perreault et al. |
| 6,101,214 A | 8/2000 | Hershey et al. |
| 6,122,084 A * | 9/2000 | Britz .................. H04B 10/0775 385/140 |
| 6,288,632 B1 | 9/2001 | Hoctor et al. |
| 6,308,134 B1 | 10/2001 | Croyle et al. |
| 6,346,875 B1 | 2/2002 | Puckette et al. |
| 6,424,250 B1 | 7/2002 | Puckette, IV et al. |
| 6,430,210 B1 | 8/2002 | McGrath et al. |
| 6,433,976 B1 | 8/2002 | Phillips |
| 6,459,998 B1 | 10/2002 | Hoffman |
| 6,504,634 B1 * | 1/2003 | Chan ................. H04B 10/1125 398/129 |
| 6,522,243 B1 | 2/2003 | Saulnier et al. |
| 6,659,715 B2 | 12/2003 | Kuesters et al. |
| 6,693,556 B1 | 2/2004 | Jones et al. |
| 6,717,660 B1 | 4/2004 | Bernardo |
| 6,943,668 B2 | 9/2005 | Gaus, Jr. et al. |
| 7,175,082 B2 | 2/2007 | Hoshina |
| 7,248,149 B2 | 7/2007 | Bachelder et al. |
| 7,294,977 B1 | 11/2007 | Eusterbrock et al. |
| 7,418,346 B2 | 8/2008 | Breed et al. |
| 7,460,787 B2 | 12/2008 | Damink et al. |
| 7,580,705 B2 | 8/2009 | Kumar |
| 7,629,899 B2 | 12/2009 | Breed |
| 7,646,330 B2 | 1/2010 | Karr |
| 7,817,063 B2 | 10/2010 | Hawkins et al. |
| 7,834,555 B2 | 11/2010 | Cleland et al. |
| 7,855,376 B2 | 12/2010 | Cantin et al. |
| 7,876,864 B2 | 1/2011 | Conrad et al. |
| 7,899,621 B2 | 3/2011 | Breed et al. |
| 7,912,645 B2 | 3/2011 | Breed et al. |
| 7,983,685 B2 | 7/2011 | Silverstrim et al. |
| 7,983,836 B2 | 7/2011 | Breed |
| 8,092,032 B2 | 1/2012 | Pearse |
| 8,138,690 B2 | 3/2012 | Chemel et al. |
| 8,140,276 B2 | 3/2012 | Walters et al. |
| 8,227,995 B2 | 7/2012 | Damink et al. |
| 8,232,745 B2 | 7/2012 | Chemel et al. |
| 8,244,260 B2 | 8/2012 | Silverstrim et al. |
| 8,260,537 B2 | 9/2012 | Breed |
| 8,274,373 B2 | 9/2012 | Nysen |
| 8,339,069 B2 | 12/2012 | Chemel et al. |
| 8,368,321 B2 | 2/2013 | Chemel et al. |
| 8,373,362 B2 | 2/2013 | Chemel et al. |
| 8,384,312 B2 | 2/2013 | Tsai |
| 8,436,748 B2 | 5/2013 | Mimeault et al. |
| 8,441,214 B2 | 5/2013 | Anderson |
| 8,442,403 B2 | 5/2013 | Weaver |
| 8,442,785 B2 | 5/2013 | Walters et al. |
| 8,456,325 B1 | 6/2013 | Sikora |
| 8,475,002 B2 | 7/2013 | Maxik et al. |
| 8,641,241 B2 | 2/2014 | Farmer |
| 8,840,569 B2 | 9/2014 | Flaction et al. |
| 8,842,009 B2 | 9/2014 | Jones |
| 8,947,296 B2 | 2/2015 | Raz et al. |
| 9,192,026 B2 | 11/2015 | Marquardt et al. |
| 9,192,029 B2 | 11/2015 | Marquardt et al. |
| 2002/0141882 A1 | 10/2002 | Ingistov et al. |
| 2005/0017647 A1 | 1/2005 | Huang |
| 2005/0047864 A1 | 3/2005 | Yamada et al. |
| 2005/0104745 A1 | 5/2005 | Bachelder et al. |
| 2005/0187701 A1 | 8/2005 | Baney |
| 2007/0063875 A1 | 3/2007 | Hoffberg |
| 2007/0201540 A1 | 8/2007 | Berkman |
| 2007/0229250 A1 | 10/2007 | Recker et al. |
| 2008/0037241 A1 | 2/2008 | Von Der Brelie |
| 2008/0072766 A1 | 3/2008 | Kobylarz |
| 2008/0122642 A1 | 5/2008 | Radtke et al. |
| 2008/0150757 A1 | 6/2008 | Hutchison |
| 2008/0238720 A1 | 10/2008 | Lee |
| 2009/0002982 A1 | 1/2009 | Hu et al. |
| 2009/0033504 A1 | 2/2009 | Tsai et al. |
| 2009/0034258 A1 | 2/2009 | Tsai et al. |
| 2009/0066540 A1 | 3/2009 | Marinakis et al. |
| 2009/0120299 A1 | 5/2009 | Rahn et al. |
| 2009/0128328 A1 | 5/2009 | Fan |
| 2009/0158739 A1 | 6/2009 | Messmer |
| 2009/0164174 A1 | 6/2009 | Bears et al. |
| 2009/0167508 A1 | 7/2009 | Fadell et al. |
| 2009/0214198 A1 | 8/2009 | Takahashi et al. |
| 2009/0268453 A1 | 10/2009 | Pearse |
| 2009/0297156 A1 | 12/2009 | Nakagawa et al. |
| 2010/0013608 A1 | 1/2010 | Petrisor et al. |
| 2010/0029268 A1 | 2/2010 | Myer et al. |
| 2010/0115093 A1 | 5/2010 | Rice |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0295943 A1 | 11/2010 | Cha et al. |
| 2010/0296285 A1 | 11/2010 | Chemel et al. |
| 2010/0301768 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0308736 A1 * | 12/2010 | Hung .................. H05B 37/034 315/149 |
| 2010/0309209 A1 | 12/2010 | Hodgins et al. |
| 2011/0001436 A1 | 1/2011 | Chemel et al. |

(56) References Cited

U.S. PATENT DOCUMENTS

| | | |
|---|---|---|
| 2011/0001438 A1 | 1/2011 | Chemel et al. |
| 2011/0001626 A1 | 1/2011 | Yip et al. |
| 2011/0043035 A1 | 2/2011 | Yamada et al. |
| 2011/0069960 A1 | 3/2011 | Knapp et al. |
| 2011/0095867 A1 | 4/2011 | Ahmad |
| 2011/0115384 A1 | 5/2011 | Chatelus |
| 2011/0140950 A1 | 6/2011 | Andersson |
| 2011/0156900 A1 | 6/2011 | Toda |
| 2011/0215736 A1 | 9/2011 | Horbst et al. |
| 2011/0227584 A1 | 9/2011 | Beck |
| 2011/0288658 A1 | 11/2011 | Walters et al. |
| 2012/0053888 A1 | 3/2012 | Staehlin et al. |
| 2012/0062123 A1 | 3/2012 | Jarrell et al. |
| 2012/0086560 A1 | 4/2012 | Ilyes et al. |
| 2012/0086561 A1 | 4/2012 | Ilyes et al. |
| 2012/0126721 A1 | 5/2012 | Kuenzler et al. |
| 2012/0136485 A1 | 5/2012 | Weber et al. |
| 2012/0140748 A1 | 6/2012 | Carruthers |
| 2012/0154239 A1 | 6/2012 | Bar-Sade et al. |
| 2012/0163826 A1 | 6/2012 | Schenk et al. |
| 2012/0209505 A1 | 8/2012 | Breed et al. |
| 2012/0218101 A1 | 8/2012 | Ford |
| 2012/0230696 A1 | 9/2012 | Pederson et al. |
| 2012/0245880 A1 | 9/2012 | Nabrotzky |
| 2012/0256777 A1 | 10/2012 | Smith et al. |
| 2012/0262304 A1 | 10/2012 | Cripps |
| 2012/0280825 A1 | 11/2012 | Sakakihara |
| 2012/0286673 A1 | 11/2012 | Holland et al. |
| 2012/0299721 A1 | 11/2012 | Jones |
| 2012/0299755 A1 | 11/2012 | Jones |
| 2012/0308239 A1 | 12/2012 | Sheth et al. |
| 2012/0309293 A1 | 12/2012 | Kummetz et al. |
| 2012/0321321 A1 | 12/2012 | Riesebosch |
| 2012/0323474 A1 | 12/2012 | Breed et al. |
| 2013/0044488 A1 | 2/2013 | Hreish |
| 2013/0057158 A1 | 3/2013 | Josefowicz et al. |
| 2013/0063281 A1 | 3/2013 | Malaska |
| 2013/0076523 A1 | 3/2013 | Kwan et al. |
| 2013/0101003 A1 | 4/2013 | Vedantham et al. |
| 2013/0140995 A1 | 6/2013 | Jones |
| 2013/0144490 A1 | 6/2013 | Lord et al. |
| 2013/0169468 A1 | 7/2013 | Johnson et al. |
| 2013/0172012 A1 | 7/2013 | Zudrell-Koch |
| 2013/0181636 A1 | 7/2013 | Agrawal |
| 2013/0214697 A1 | 8/2013 | Archenhold |
| 2013/0221858 A1* | 8/2013 | Silberstein ......... H05B 37/0272 315/153 |
| 2013/0229116 A1 | 9/2013 | Van Zeijl et al. |
| 2013/0257284 A1 | 10/2013 | VanWagoner et al. |
| 2013/0293117 A1 | 11/2013 | Verfuerth |
| 2013/0330172 A1 | 12/2013 | Scipio et al. |
| 2013/0346229 A1 | 12/2013 | Martin et al. |
| 2014/0055439 A1 | 2/2014 | Lee et al. |
| 2014/0085055 A1 | 3/2014 | Lee et al. |
| 2014/0124007 A1 | 5/2014 | Scipio et al. |
| 2014/0125250 A1 | 5/2014 | Wilbur |
| 2014/0175982 A1 | 6/2014 | Yao et al. |
| 2014/0191858 A1 | 7/2014 | Morgan et al. |
| 2015/0023668 A1 | 1/2015 | Spaulding et al. |
| 2015/0173159 A1 | 6/2015 | Lin et al. |
| 2015/0319825 A1 | 11/2015 | Destine et al. |
| 2016/0094088 A1 | 3/2016 | Bjorn et al. |
| 2016/0095182 A1 | 3/2016 | Bjorn et al. |

FOREIGN PATENT DOCUMENTS

| | | |
|---|---|---|
| EP | 2521426 A1 | 11/2012 |
| GB | 2403357 A | 12/2004 |
| JP | 05205193 A | 8/1993 |
| JP | 2005248607 A | 9/2005 |
| JP | 2009025209 A | 2/2009 |
| JP | 2009103497 A | 5/2009 |
| KR | 1020060008967 A | 1/2006 |
| KR | 1020060102552 A | 9/2006 |
| KR | 100986279 B1 | 10/2010 |
| WO | 2005029437 A2 | 3/2005 |
| WO | 2009148466 A1 | 12/2009 |
| WO | 2010079388 A1 | 7/2010 |
| WO | 2011142516 A1 | 11/2011 |
| WO | 2012090142 A2 | 7/2012 |
| WO | 2012140152 A1 | 10/2012 |
| WO | 2013160791 A2 | 10/2013 |

OTHER PUBLICATIONS

U.S. Appl. No. 14/546,982, filed Nov. 18, 2014, Hershey et al.
U.S. Appl. No. 14/546,954, filed Nov. 18, 2014, Hershey et al.
U.S. Appl. No. 14/484,300, filed Sep. 12, 2014, Hartman et al.
U.S. Appl. No. 14/546,486, filed Nov. 18, 2014, Hartman et al.
U.S. Appl. No. 14/546,408, filed Nov. 18, 2014, Hartman et al.
U.S. Appl. No. 14/546,256, filed Nov. 18, 2014, Barnett et al.
U.S. Appl. No. 14/546,856, filed Nov. 18, 2014, Hartman et al.
Atlas, "Optical Extinction by Rainfall", Journal of Meteorology, vol. No. 10, pp. 486-488, Dec. 1953.
Noe et al., "Global Positioning System, A Navigation Algorithm for the Low-Cost GPS Receiver", The Institute of Navigation, vol. No. 1, pp. 166-172, 1980.
Proakis, "Spread Spectrum Signals for Digital Communication," in Digital Communications, for an overview of DS theory, pp. 1-27, 1983.
Hershey et al., "Random and Pseudorandom Sequences," Data Transportation and Protection, pp. 259-310, 1986.
"Millimeter Wave Propagation: Spectrum Management Implications" published by the FCC as Bulletin No. 70, Jul. 1997.
Pang et al., "LED Traffic Light as a Communications Device", Proceedings of the International Conference on Intelligent Transportation Systems, pp. 788-793, 1999.
Mimbela et al., "A Summary of Vehicle Detection and Surveillance Technologies Used in Intelligent Transportation Systems", Southwest Technology Development Institute, pp. 1-211, Nov. 30, 2000.
Bullimore, "Controlling Traffic With Radio", IEEE Review, vol. No. 47, Issue No. 1, pp. 40-44, Jan. 2001.
Chao-Qun et al., "Application of Low-voltage Power Line Communication in a City Street Lamp Long-distance Intelligent Monitoring System", Research and Developments, 2006.
Cho et al., "Street Lighting Control Based on LonWorks Power Line Communication", Power Line Communications and Its Applications, pp. 396-398, Apr. 2008.
Awan et al., "Characterization of Fog and Snow Attenuations for Free-Space Optical Propagation", Journal of Communications, vol. No. 4, Issue No. 8, pp. 533-545, Sep. 2009.
Rich, "Light Monitoring System Keeps Glendale, Ariz., Out of the Dark", Government Technology, Oct. 24, 2011.
"Monitoring and Evaluation Protocol for the Field Performance of LED Street Lighting Technologies", Light Savers Accelerating Advanced Outdoor Lighting, Prepared by Toronto Atmospheric Fund in Partnership with Ontario Municipal Street Lighting Focus Group and Ontario Power Authority, pp. 1-32, 2011.
Qian et. al., "Based on PLC and GPRS, ZigBee street lamp wireless control system", Electronic Design Engineering, vol. No. 20, Issue No. 3, Feb. 2012.
Stevens et al., "White Paper—The Benefits of 60 GHz Unlicensed Wireless Communications" as captured by Wayback machine, SUB10 systems.com, pp. 1-10, May 7, 2012.
"Wireless Control and Communication System for LED Luminaires and Other Devices", San Francisco Public Utilities Commission Power Enterprise, pp. 1-15, Jun. 7, 2012.
Zotos et al., "Case study of a dimmable outdoor lighting system with intelligent management and remote control", Telecommunications and Multimedia (TEMU), 2012 International Conference on, pp. 43-48, Jul. 30-Aug. 1, 2012.
Caillet et al., "LonMark, the open Smart Streetlight Platform", Lonmark International, pp. 1-16, Feb. 2013.
After Newtown: A new use for a weapons-detecting radar?, University of Michigan, Apr. 1, 2013.

(56) References Cited

OTHER PUBLICATIONS

Lee et al., "Distributed dimming control for LED lighting", Optics Express, vol. No. 21, Issue No. S6, pp. 1-16, Nov. 2013.

International Search Report and Written Opinion issued in connection with related PCT Application No. PCT/US2014/066954 dated Feb. 26, 2015.

International Search Report and Written Opinion issued in connection with related PCT Application No. PCT/US2014/066922 dated Feb. 26, 2015.

International Search Report and Written Opinion issued in connection with related PCT Application No. PCT/US2014/066957 dated Mar. 5, 2015.

International Search Report and Written Opinion issued in connection with related PCT Application No. PCT/US2014/066917 dated Mar. 5, 2015.

International Search Report and Written Opinion issued in connection with related PCT Application No. PCT/US2014/066337 dated Mar. 6, 2015.

International Search Report and Written Opinion issued in connection with related PCT Application No. PCT/US2014/066948 dated Mar. 9, 2015.

International Search Report and Written Opinion issued in connection with related PCT Application No. PCT/US2014/066942 dated Mar. 20, 2015.

International Search Report and Written Opinion issued in connection with corresponding PCT Application No. PCT/US2014/066927 dated Feb. 27, 2015.

US Non-Final Office Action issued in connection with related U.S. Appl. No. 14/484,300 on Dec. 4, 2015.

US Non-Final Office Action issued in connection with related U.S. Appl. No. 14/546,256 on Dec. 30, 2015.

US Non-Final Office Action issued in connection with related U.S. Appl. No. 14/546,982 on Feb. 1, 2016.

US Non-Final Office Action issued in connection with related U.S. Appl. No. 14/546,954 on Apr. 20, 2016.

US Non-Final Office Action issued in connection with related U.S. Appl. No. 14/543,892 on May 9, 2016.

Final Office Action issued in connection with related U.S. Appl. No. 14/546,256 on Jun. 2, 2016.

Notice of Allowance Office Action issued in connection with related U.S. Appl. No. 14/543,892 on Aug. 26, 2016.

Notice of Allowance Office Action issued in connection with related U.S. Appl. No. 14/546,954 on Sep. 16, 2016.

\* cited by examiner

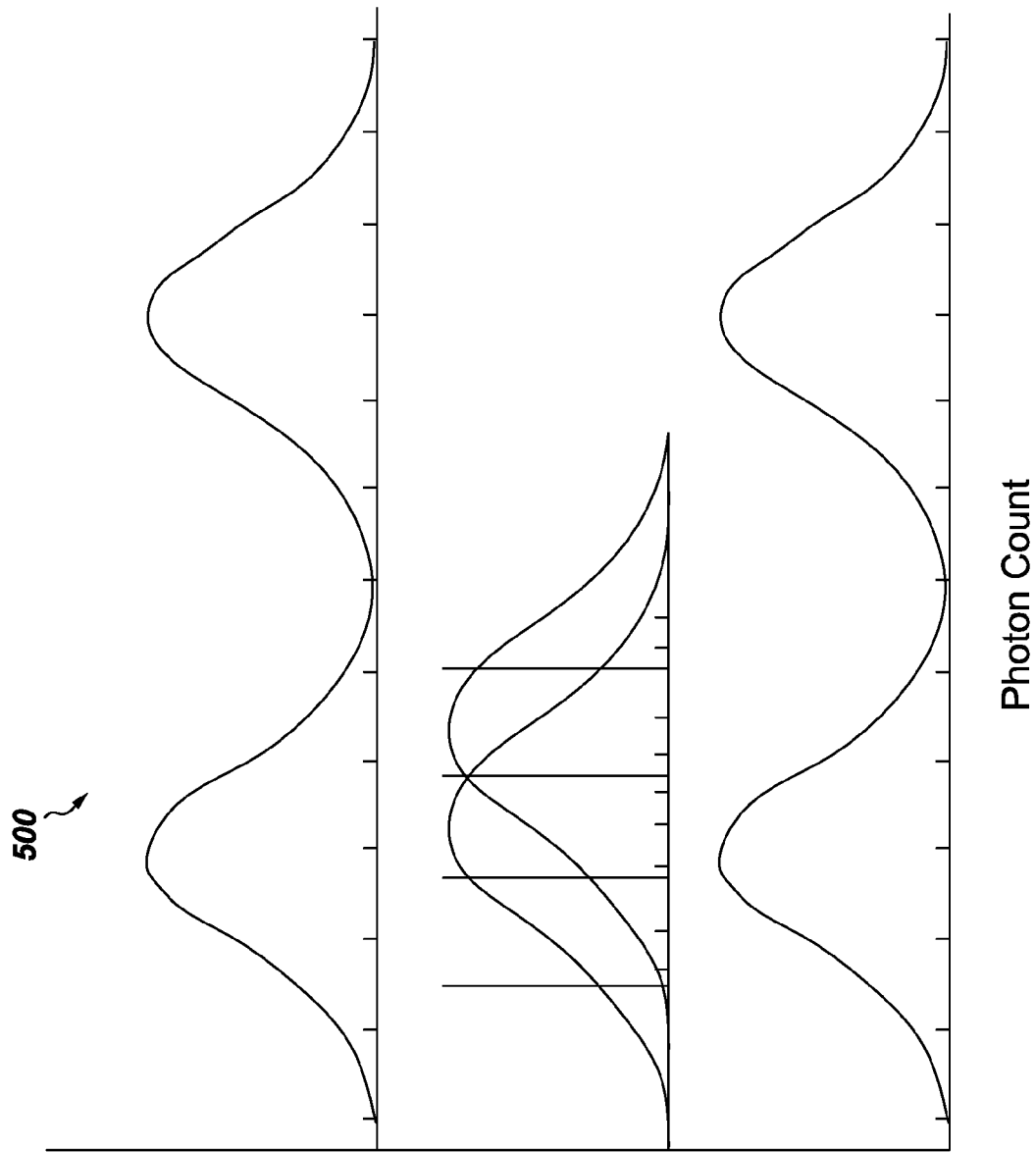

STREET LIGHTING CONTROL, MONITORING, AND DATA TRANSPORTATION SYSTEM AND METHOD

This application is a non-provisional of and claims the benefit of U.S. Provisional Patent Application Ser. Nos. 61/907,069, 61/907,078, 61/907,090, 61/907,114, 61/907,133, 61/907,150, 61/907,168, 61/907,188 and 61/907,210 filed on Nov. 21, 2013, the entire contents of which are incorporated herein by reference.

BACKGROUND

Street lighting continues to be one of a city's most important and pressing concerns for various reasons. It is very important to try to ensure that adequate lighting is provided for the safety of the pedestrians and motorized and non-motorized vehicle operators and passengers.

Power line carried communications (PLC) are sometimes used for controlling and monitoring street lighting luminaires. PLC may suffer from grounding practices and various impedance mismatch problems such as those encountered when signals transit from one type of power service main to another. Impedance mismatches may result in signal attenuation in crossing the service main transition point, signal reflection resulting in increased interference on the communications signal, and also standing wave phenomena deleterious to PLC communications. If the power line should also serve inductive loads such as fans or air conditioning equipment, capacitor banks may have been installed to correct the power factor. Such capacitor installations may result in severe attenuation of high frequency signals. High frequency signals also experience high attenuation if there is an isolation transformer in the power path, or voltage equalizers such as tap changer transformers. Additional problems are the time changing nature of the PLC channel which may adversely affect its linearity and time invariance for designing signaling sets using techniques implicitly depending upon superposition. Additionally, the communications useful bandwidth of the power line is a function of many parameters including noise. According to the IEEE Standard for Broadband over Power Line Networks, Annex F, power line channels are subject to four classes of noise. They include thermal background noise that is Gaussian and colored, periodic and aperiodic impulsive noise, AM narrowband noise, and noise from other users of the power line qua a communications medium.

Another choice for communications control and monitoring is by wireless non-optical RF communication links. These links are, however, vulnerable to several problems including changing propagation environments due to construction, vehicle movements, and other time-varying communication path impairments. The wireless non-optical RF communication links are also susceptible to degradation due to changing electromagnetic noise characteristics and also potential malicious interference. Such changing environmental aspects may increase the latency of the communications transported on a mesh network, for example, decrease its usable bandwidth, and concomitantly reduce its throughput. Additionally, operational problems with wireless non-optical RF mesh networks have been reported including difficult maintenance from management complexities, antenna design and successful operation under real-world conditions. Problems include implementation and maintenance issues, protocol problems and discovered deficiencies under scaling and unanticipated interference scenarios.

An additional consideration requiring attention has to do with the nature of the light production itself. Conventional lighting is costly to operate and to maintain. It is for this reason that many city infrastructure authorities have decided to either replace or newly install street lighting that is LED-based. It is important that the individual luminaires of a street lighting installation be monitored in order to determine continued and proper functioning. One of the challenges with LED lighting is that it differs from conventional lighting in a way that may make it more difficult to assess its functional condition. This difference is in the ageing process. A conventional lamp may be considered to be in one of two states: either functional or non-functional (burned out). When a conventional lamp burns out it draws no current. An LED on the other hand becomes dimmer as it ages and there is no change in electrical current that may be directly monitored to assess the condition of the LED.

There is therefore a need to develop alternative control communication techniques and better systems and methods for assessing the condition of street lighting led-based luminaires, and reporting and subsequently locating the luminaires whose light production is below a specified threshold.

SUMMARY

The present invention presents a method and system for controlling and monitoring street lights using optical link signaling. The optical signaling is accomplished through the free space between the street lights which does not require an FCC license for operation. The optical link signaling is accomplished by using luminaire LEDs for both area lighting and optical signaling.

In an embodiment, the street lighting system includes a plurality of street lights comprising: a luminaire, or lamp, having at least one LED; a structural member such as a pole; and a luminaire associate comprising an optical receiver and modulator. The optical receiver receives optical signaling from one or more other luminaires in the street lighting network.

In an embodiment, the modulator modulates the output of lamp to launch data into street lighting system for transport.

In another embodiment, the optical receiver and modulator enables strobing and flashing modes such as required to support emergency services.

BRIEF DESCRIPTION OF ILLUSTRATIONS

FIGS. 5A-5C illustrate a progression of circumstances illustrating stabilization of the optical communication error rate according to an embodiment.

DETAILED DESCRIPTION

A street lighting system comprises numerous luminaires (street lights). Each luminaire may comprise one or more LEDs that are operated to illuminate selected real estate with a typical visible light intensity of about 2 candelas per square meter.

An LED is unlike an incandescent lamp. A significant difference between incandescent lamps and LEDs is that an LED's light output is at 100 percent brightness almost immediately upon activation. Also, an LED's health is not affected by rapid cycling, i.e., being repeatedly turned on and off.

LEDs are quite different from incandescent lamps in many other ways. One very pronounced difference is that, unlike incandescent lamps, LEDs do not burn out but gradually dim. It is a typical metrological practice to measure an LED lifetime on what is known as the L70 standard. The L70 standard is the average hours of operation delivered by the LED prior to its output lumens falling below 70 percent of its original output. Most LEDs used in street lighting applications are expected to adhere to an L70 standard of about 10 years.

Street lighting systems may be controlled optically using inter-street lighting fixture free space optical link signaling which does not require an FCC license for operation. The optical link signaling may be accomplished by using the luminaire LEDs for both area lighting and optical signaling.

Figure 1:
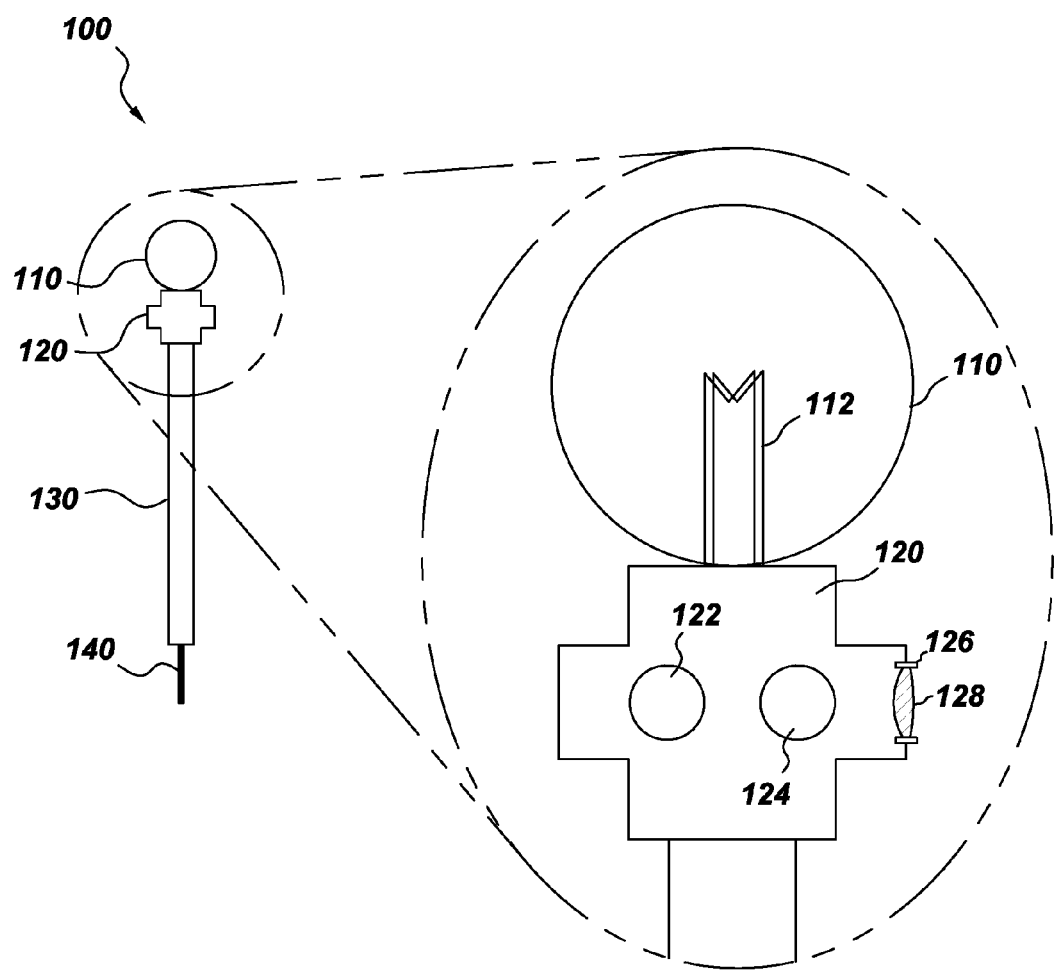
FIG. 1 is an illustration identifying the segments of a lighting fixture according to an embodiment.

An embodiment of the lighting system is described by segmentation into parts as illustrated in FIG. 1. The lighting fixture 100 comprises a lamp or luminaire 110, supported by a luminaire associate 120 that comprises the electronic components, electrical circuitry, and mechanical couplings associated with the mounting and control of the luminaire 110. The luminaire associate 120 is mounted atop a pole 130 that also provides a conduit for the powerline 140 serving the luminaire associate 120 and the luminaire 110.

The luminaire associate 120 may include one or more optical receivers configured to optically receive signals from one or more other luminaires in the street lighting network. The luminaire associate 120 may also include a Light Emitting Diode (LED) 112, an optical receiver 122 and a modulator that modulates light output of luminaire 110 to launch or relay data into the street lighting system for transport. In some embodiments the optical receiver and modulator may enable strobing and flashing modes such as required to support emergency services.

The luminaire associate 120 may also comprise a computer and memory used to control sensors and interpret their data. This allows the luminaire associate to perform computational tasks, support communication messaging, communication protocol functions, and other functions requiring computation and data storage. Some luminaire associates may also comprise an optical receiver that is used to receive optical transmissions from optical devices other than luminaires. Some luminaire associates may further comprise a GPS receiver 124.

Figure 2A:
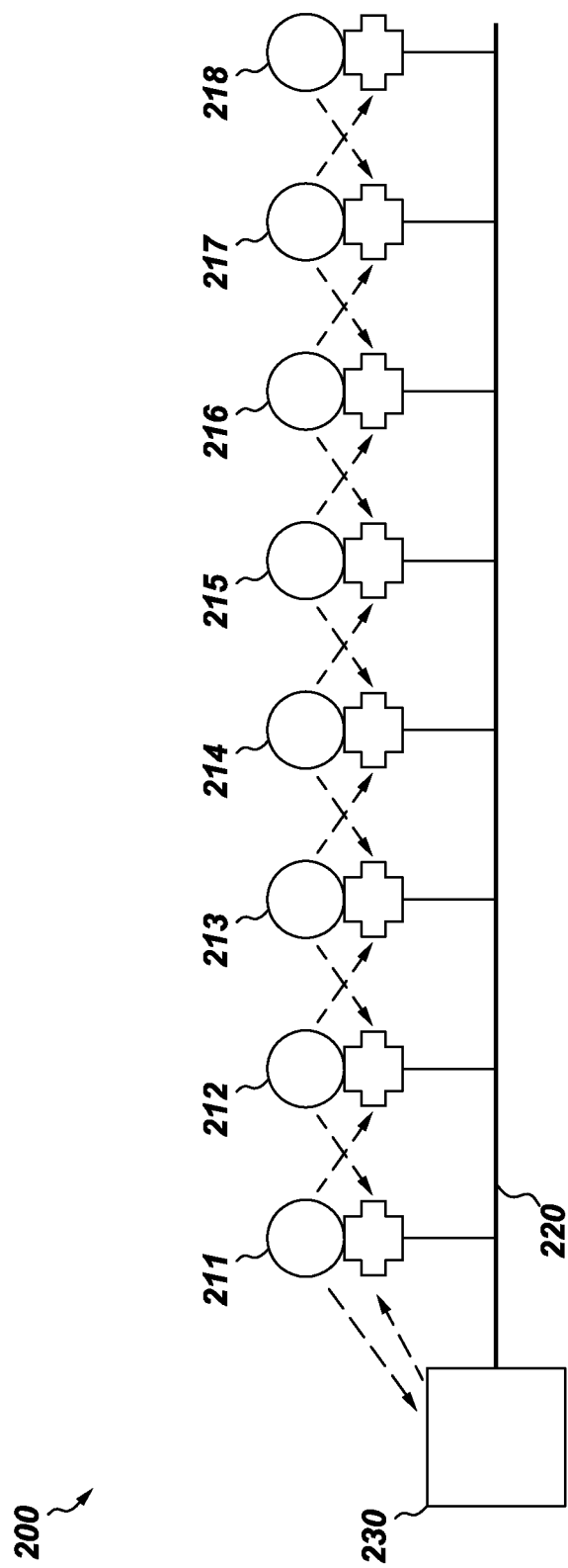
FIG. 2A illustrates an optical signaling network for street lighting fixtures according to an embodiment.

FIG. 2A illustrates one embodiment of a street lighting system 200. Eight lighting fixtures 211-218 are illustrated, each lighting fixture in optical communication with a neighbor. The lighting fixtures are powered by a power line 220 that is also connected to a street light communications access point 230 that is also in optical communication with the street lighting optical communication network.

Figure 2B:
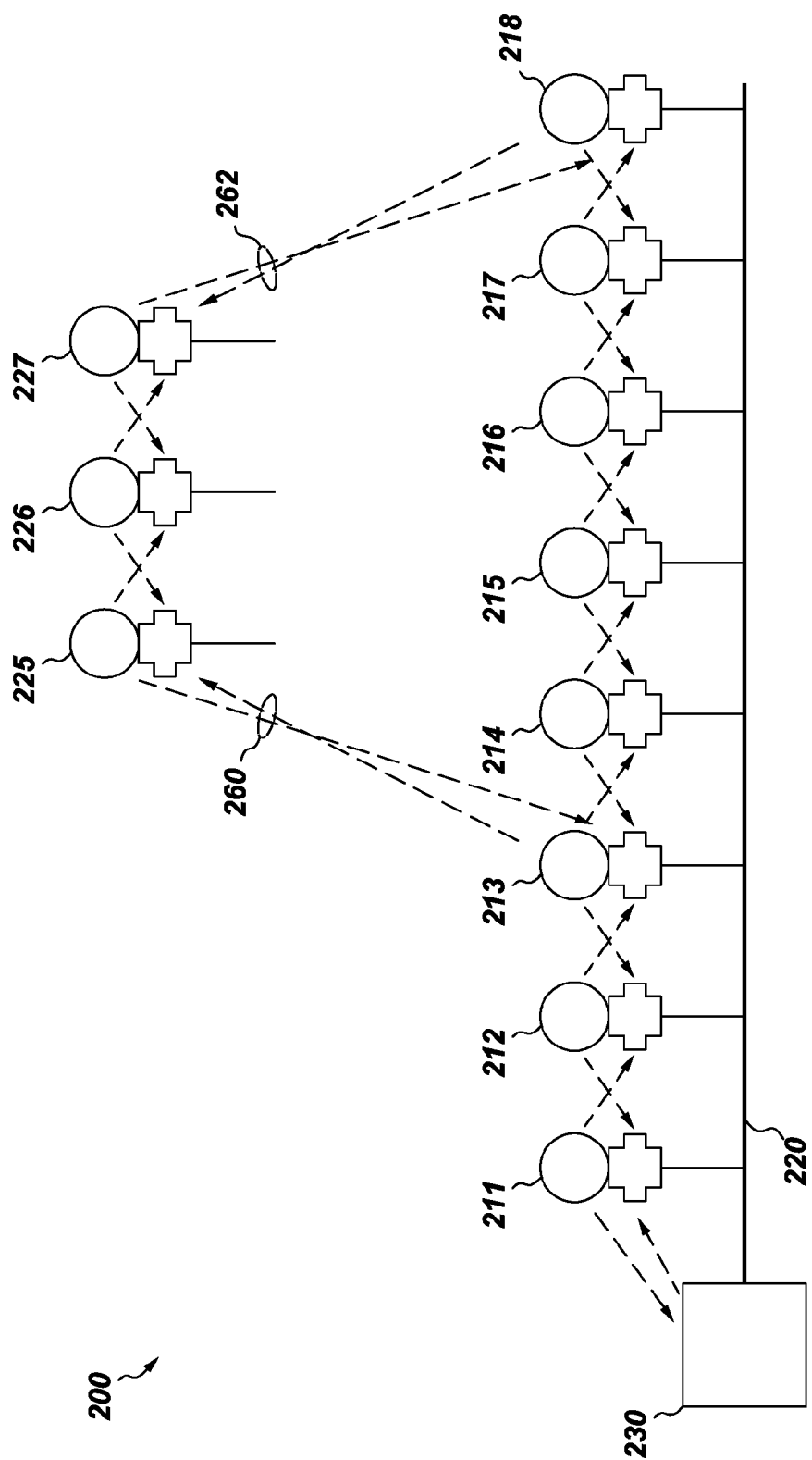
FIG. 2B illustrates a sparsely connected mesh network according to an embodiment.

The optical signaling network supports several functions including controlling the street lighting system. The optical signaling network may be in the form of a mesh network. A sparsely connected mesh network is illustrated in FIG. 2B in which another section of a street lighting system comprising lighting fixtures 225-227 has optical links 260 between street lighting fixtures 213 and 225 and optical links 262 between street lighting fixtures 218 and 227.

In some embodiments, optical signaling from other optically enabled devices in a supported infrastructure or from mobile optical emitters may establish communications with the street lighting optical communication network. This allows the supported infrastructure or mobile optical emitters to transport data through the street lighting optical communication network or to send a message, such as a command, to a particular luminaire associate.

Figure 3:
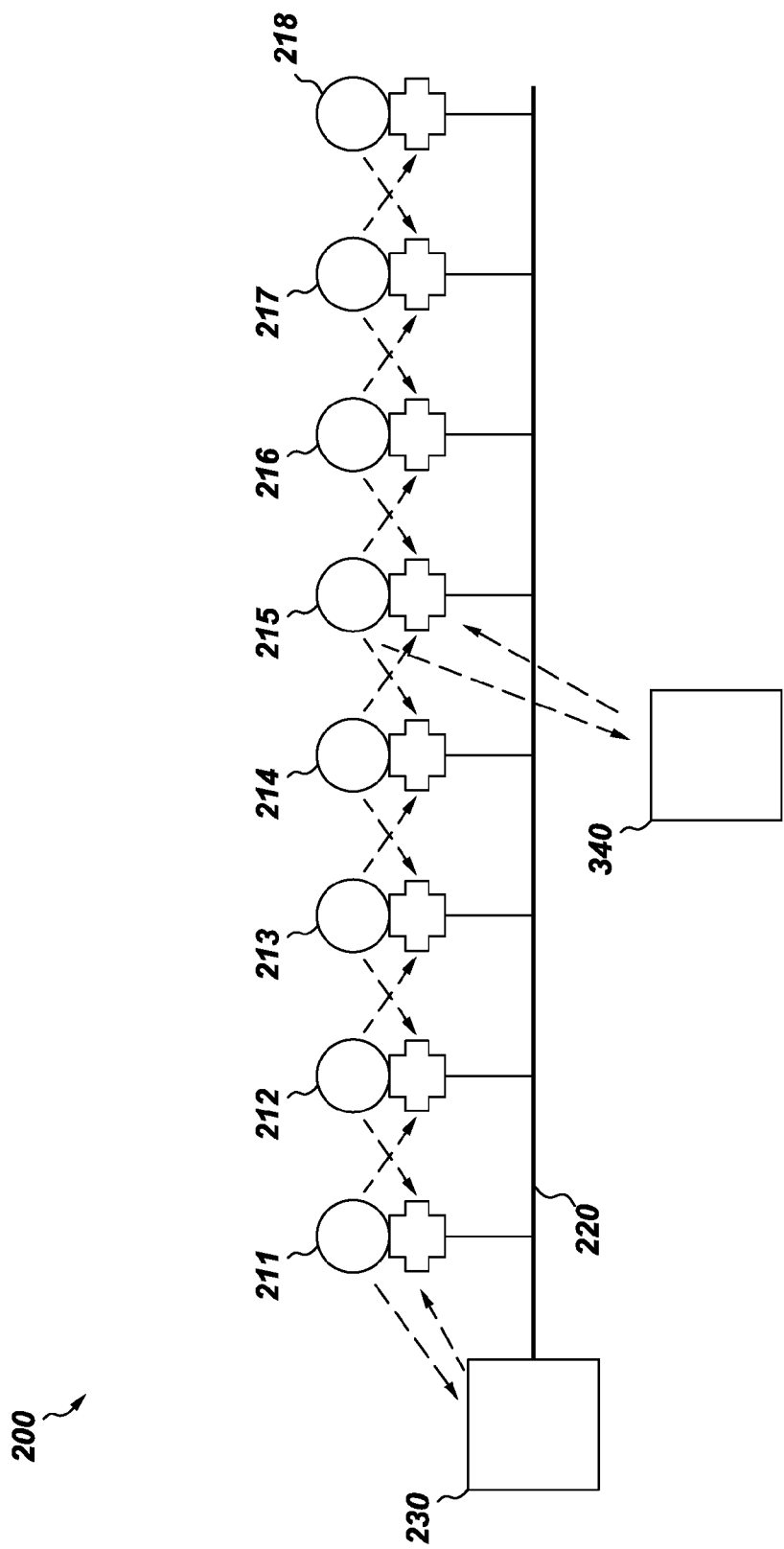
FIG. 3 illustrates a fixed or mobile device joined to the optical signaling network according to an embodiment.

FIG. 3 illustrates an optically enabled device 340 in two-way optical communication with lighting fixture 215 of the street lighting optical communication network 200. The optically enabled device 340 may be a fixed device or a mobile device and may interface with the street lighting optical communication network 200 to transmit and receive optical signals. The street lighting optical communications network 200 may transport communications received from a fixed or mobile optically enabled device 340 to recipients connected to the street lighting optical communication network. Also, optically enabled device 340 may receive communications from optical transmitters connected to the street lighting optical communications network. Optically enabled device 340 may be capable of emitting optical signals that can be received by street lighting optical communications network 200 and/or receiving optical signals that are transmitted by the street lighting optical communications network 200.

Messages from a fixed or mobile optically enabled device 340 may be accepted by a luminaire associate comprising an optical receiver that is used to receive optical transmissions from optical devices other than luminaires. In an embodiment, the luminaire associate may send a clear-to-send signal notifying mobile optically enabled device 340 that it may begin its transmission. In one embodiment, the luminaire associate sends the clear-to-send signal based on a master timing signal broadcast through the optical signaling network. In another embodiment, the luminaire associate sends the clear-to-send signal based on time slots assigned for receiving transmissions from the optically enabled device 340. In an embodiment, the luminaire associate identifies the beginning and end of the time slots using a GPS receiver that is included within the luminaire associate.

Figure 4A:
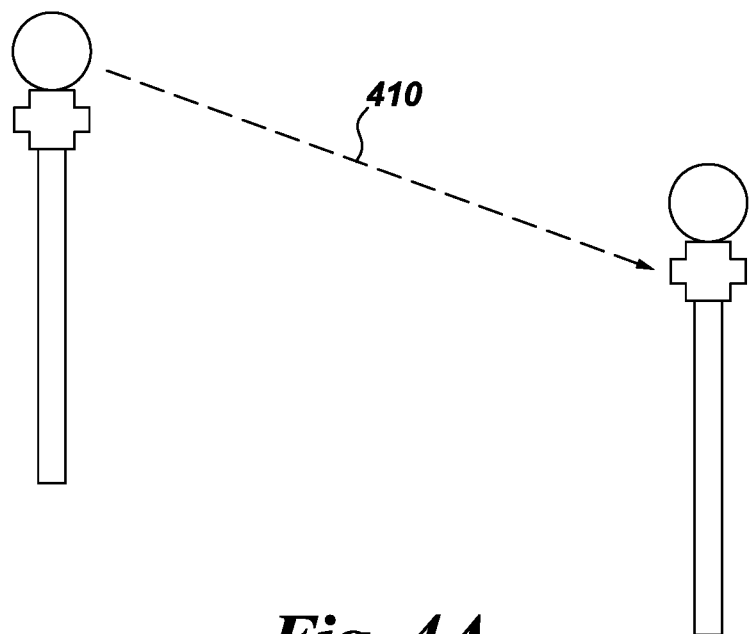
FIG. 4a illustrates a direct optical signaling path according to an embodiment.

The optical links between the lighting fixtures of the street lighting system may be a direct lighting fixture to lighting fixture path, that is, the optical receiver in a lighting fixture receives modulated light 410 directly from another lighting fixture's luminaire as illustrated in FIG. 4a. This may be accomplished by equipping the receiving luminaire associate with an optical receiver and modulator. The luminaire associate may be equipped with an optical receiving aperture FIG. 1; 126) and/or optical transmitting apertures. In an embodiment, orienting the optical receiving aperture such that it is placed into a position to receive messages modulated within a light beam may be accomplished using manual, electronic, or electro-mechanical mechanisms. Once oriented, light from another luminaire may be incident falls on the optical receiving aperture, opening an optical communications path and enabling communications with another optical device. Other optical devices may include, but are not limited to, smart-phones, tablet computers, laptop computers, desktop computers, other smart street lights, remote control devices or other devices capable of transmitting an optical signal.

Figure 4B:
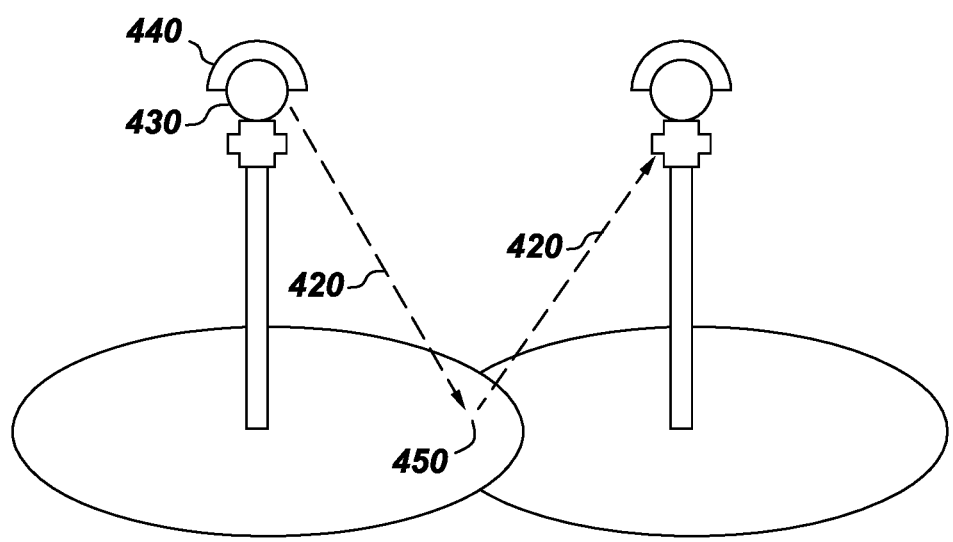
FIG. 4b illustrates an indirect optical signaling path according to an embodiment.

In some street lighting systems, there may not be a direct optical path to allow for direct optical signaling from one lighting fixture to another as illustrated in FIG. 4b. An example of a situation in which there may not be a clear optical path is cases for street lighting luminaires equipped with a partial shroud 440 that blocks part of the light emitted by the luminaire 430. The shrouds can result in two neighboring lighting fixtures illuminating the selected real estate 450 with overlapping ovals of light. In an embodiment, in which direct optical signaling is not a viable option, an inter-lighting fixture optical channel may be achieved by orienting the optical receiving aperture of one lighting fixture to receive so that light emitted from the luminaire of another lighting fixture that has scattered off of a portion of the selected real estate 450.

Free space optical communication links may be adversely affected by atmospheric conditions such as haze, mist, fog, sleet, snow, dust, smoke, and rain. Of these atmospheric absorbers and scatterers, fog and heavy snow are the most impactful. A collimated beam of light having a flux of $\Phi_0$ at the source will have a flux, $\Phi$, at range R of $\Phi=\Phi_0 e^{-\sigma_e R}$ where $\sigma_e$ is the extinction coefficient. (Note that for these calculations it is not necessary to be concerned with intensity drop-off in free space as the light beam is collimated.)

As for concerns regarding fog and snow and their optical attenuation, the paper "Characterization of Fog and Snow Attenuations for Free-Space Optical Propagation" by Awan et al, Journal of Communications, Vol. 4, No. 8, September 2009, pp. 533-545, informs that attenuation of 45 dB/km has been reported for dry snowfall conditions. Using data from the paper, the attenuation range of dB loss of intensity due to fog may be as presented in Table 1.

TABLE 1

Attenuation (dB) of Beam Strength versus Type of Fog and Distance through Fog

| Type of fog | Visibility range (m) | Collimated beam path length (m) | | | | | |
|---|---|---|---|---|---|---|---|
| | | 50 | 100 | 150 | 200 | 250 | 300 |
| Light | 500-1000 | 0.47-1.00 | 0.93-2.00 | 1.40-3.00 | 1.86-4.00 | 2.33-5.00 | 2.79-6.00 |
| Moderate | 250-500 | 1.00-2.00 | 2.00-4.00 | 3.00-6.00 | 4.00-8.00 | 5.00-10.0 | 6.00-12.0 |
| Thick | 70-250 | 2.00-7.15 | 4.00-14.3 | 6.00-21.5 | 8.00-28.6 | 10.0-35.8 | 12.0-42.9 |
| Dense | 40-70 | 7.15-12.5 | 14.3-25.0 | 21.5-37.5 | 28.6-50.0 | 35.8-62.5 | 42.9-75.0 |

As concerns the deleterious effect of rain on free space optical links, according to "Optical Extinction by Rainfall" by David Atlas, Journal of Meteorology, Vol. 10, December 1953, pp. 486-488, the extinction coefficient, $\sigma_e$, per kilometer of range, for Bergeron-process rain (common rainfall production from cool clouds) is $\sigma_e \approx 0.25 \cdot W^{0.63}$ where W is the Bergeron-process rainfall rate in mm/hr. Table 2 presents the dB loss of intensity due to Rainfall Rate and the path distance through the rain for different values of R and W.

TABLE 2

Attenuation (dB) of Beam Strength versus Rainfall Rate and Distance through Rain

| Rainfall rate mm/hr | Collimated beam path length (m) | | | | | |
|---|---|---|---|---|---|---|
| | 50 | 100 | 150 | 200 | 250 | 300 |
| 0 | 0 | 0 | 0 | 0 | 0 | 0 |
| 25 | 0.41 | 0.82 | 1.24 | 1.65 | 2.06 | 2.47 |
| 50 | 0.64 | 1.28 | 1.91 | 2.55 | 3.19 | 3.83 |
| 75 | 0.82 | 1.65 | 2.47 | 3.30 | 4.12 | 4.95 |

TABLE 2-continued

Attenuation (dB) of Beam Strength versus Rainfall Rate and Distance through Rain

| Rainfall rate mm/hr | Collimated beam path length (m) | | | | | |
|---|---|---|---|---|---|---|
| | 50 | 100 | 150 | 200 | 250 | 300 |
| 100 | 0.99 | 1.98 | 2.96 | 3.95 | 4.94 | 5.93 |
| 125 | 1.14 | 2.27 | 3.41 | 4.55 | 5.69 | 6.82 |
| 150 | 1.27 | 2.55 | 3.82 | 5.10 | 6.37 | 7.64 |

The entries in Tables 1 and 2 show that light fog or moderate rainfall are not likely to pose significant communication problems for optical links spanning typical ranges of inter-street lighting distances.

Link interference can arise due to modulated light from non-neighboring light fixtures or signaling energy incidentally received from other optical signaling links. Additionally, received optical energy from non-optical signaling links such as vehicle headlamp reflections falling on a light fixture's optical receiving aperture can create interference. Interference may also result from physical blockages of the optical path such as by birds, bats, or insect swarms. Amelioration of these interference problems may be done through careful alignment techniques of the apertures for a lighting fixture optical receiver, signaling design to militate non-optical signaling optical energy, and physical design to discourage intermittent obstructions by animals.

Interfering light may be reduced by polarization techniques as light that is reflected off of a surface interface will tend to be polarized, with the direction of polarization (the way the electric field vectors point) being parallel to the plane of the surface interface.

In one embodiment, the optical receiving aperture (FIG. 1; 126) for a light fixture is covered with a polarizing filter (FIG. 1; 128) that may be rotationally oriented to block the passage of interfering light that has been reflected off of a surface interface. Blocking the passage may be desirable as such light will generally be polarized with polarization direction parallel to the plane of the surface interface. The rotation of the polarizing filter may be performed by manual rotation, by an electric motor, or by electro-optical means.

Optical links are beneficial for at least two additional reasons. The first of these is that the optical link is less likely to undergo degradation as the infrastructure changes by expansion or modification. RF communications, especially in the changing dielectric canyons of a large built up urban area, or by traffic patterns that insinuate multipath in the RF signaling, may tend to become unstable in performance. Also, there is the additional, problem of interference from electrical noise processes and cross-talk from other communication system RF links and even from the RF links in the RF-based streetlight communications system. This interference is far more likely and much more difficult to ameliorate than similar problems in an optical-link based streetlight communication system.

The second of these additional reasons is that, the optical link is used to assess the condition of a street light's luminaire. Measurements of the received output of the nearest or nearby street light luminaire by the optical receiver of a nearest neighbor luminaire associate allows a health assessment of the nearest or nearby street light's luminaire and an assessment of the atmospheric conditions, e.g., the presence of rain or fog.

The light output of a neighboring street light luminaire may be monitored periodically, on demand, and/or in a differential fashion using previous data as a reference and reporting by sending only the delta value (or change from the last reported measurement) if the delta value exceeds a preset magnitude. Reporting delta values can lead to ambiguity that needs to be resolved. For example, if a standard continuous report were initiated from each luminaire associate of a street light fixture of the light received from a neighboring street light luminaire, it might not be possible to differentiate between failure of the neighboring street light luminaire or a rain condition. In order to resolve this ambiguity, the street light luminaire associate's optical receiver could save its measurement of the received light and compare it to a measurement made later on, after atmospheric conditions had time to change.

Implementation of optical signaling techniques may vary the optical output of the luminaire to a street lighting fixture. Accordingly, to provide signaling for data to be transmitted, it may necessary to ensure that the output variations will not be distracting or, at best, not noticeable by human observers. As lighting conditions change, sometimes rapidly, one embodiment envisions signaling that is differential in nature and not based on fixed levels of light intensity.

Psycho-visual studies have shown that at 2 candelas per square meter, which is a typical illumination intensity provided by street lighting, a human observer does not detect changes of −20 dBs in light intensity and therefore signaling can be accomplished with an intensity change of at least one percent.

The optical decoder of the optical signaling is likely to function as a photon counter with a decision threshold. The model for this type of optical signaling and symbol decision making is based on Poisson statistics and, for a non-photon starved environment, the Poisson counts are usually approximated by normal distributions.

The energy accorded a signaling bit may also be varied. The symbol photon integration time may be set to reduce the probability of error below a desired threshold. FIGS. 5A-5C illustrate a progression of circumstances 500. In FIG. 5A, the signaling light intensity is sufficient to result in an almost errorless decision between the two conditions, the distribution on the right representing the photon count for one of the binary signaling cases, the distribution on the left for the other. In FIG. 5B, the signaling light is diminished, possibly due to rain or fog or other atmospheric condition, and the two distributions both move to the left and overlap significantly making the binary signaling decision much more error prone. As the link may thus degrade, the signaling protocol may be designed to (1) increase the luminaire output to the street lighting fixture, or (2) increase the photon integration time, thereby reducing the data transfer rate, or (3) do both to achieve a result similar to that shown in FIG. 5C.

Robust signaling embodiments may be of additional aid in the design and implementation of optical transmitter and receiver links. Robust embodiments may employ techniques such as clock recovery, absence of a DC component, Manchester Coding and/or Differential Manchester Encoding, the latter combining data and clock to form a self-synchronizing data sequence.

In an embodiment, the optical signaling network comprises optical links that employ a protocol for handling the acceptance, transport, and delivery of messages and controls throughout the network. The protocol rules may specify a means of error control, message handling and accounting procedures, rules for dealing with transmission delays, and policies respecting retransmissions and scalability issues. The protocol rules may be fixed, software alterable, or software defined. With a software defined network, the network might, for example, be initially based on call and response polling or be a mesh with decentralized control. A software definition of the network may allow the network to be scaled more easily and the timing may be modified as appropriate from, for example, a master-slave implementation to a plesiochronous paradigm. A software-defined or software alterable dynamic network configuration may also be efficient for handling trouble shooting issues. For example, if a query does not get an answer before a timer for a particular monitor expires, it might be possible to temporarily alter the network to an ad hoc form and flood the lighting network with diagnostic messages.

There are virtually an unlimited number of protocol candidates from which to select a communications protocol. In one embodiment, towards the simplistic extreme, messages might be handled as datagrams with best delivery attempts and then, on delivery failure, discarded. In another embodiment, towards the more complicated extreme, messages might be handled with strict accountability, attempting retries, and re-routing of messages until delivery confirmation or notification to a system manager of non-delivery.

In an embodiment, a street lighting system may consider a hybrid of protocols. For most functions, the system may be reinitialized every evening and can therefore accommodate some message loss and some message errors and therefore allow the system to function adequately with a protocol that functions according to best delivery goals.

In another embodiment, some systems will handle and haul communications for other infrastructure systems. These messages may require a higher standard of care ensuring delivery or notification of non-delivery. When the streetlight optical signaling network is handling these messages, it may invoke a packet-handling protocol with strict accountability for assuring delivery and initiating retransmissions as required.

An exemplary technical effect of the methods and systems described herein includes: (a) generating a melt pool based on the build parameters of the component; (b) detecting an optical signal generated by the melt pool to measure the size or the temperature of the melt pool; and (c) modifying the build parameters in real-time based on the size or the temperature of the melt pool to achieve a desired physical property of the component.

Some embodiments involve the use of one or more electronic or computing devices. Such devices typically include a processor or controller, such as, without limitation, a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein.

The methods described herein may be encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments for enhancing the build parameters for making additive manufactured components are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with electronic components as described herein. Rather, one or more embodiments may be implemented and utilized in connection with other industries.

Although specific features of various embodiments of the invention may be shown in some drawings and not in others, this is for convenience only. In accordance with the principles of the invention, any feature of a drawing may be referenced or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for operating an optical signaling network for controlling a street lighting system comprising the steps of:
    configuring each one of a plurality of street lights with a luminaire that provides light through at least one LED (Light Emitting Diode), wherein light intensity of the at least one LED is controllable, and an optical receiver with an optical receiving aperture;
    varying an output of the at least one LED to send messages to signal at least one other optical device;
    monitoring the output of the at least one LED by at least one of the street lights to determine if there is a diminished amount of light intensity from the at least one LED required for proper signaling;
    adjusting the output of the at least one LED to reduce signaling errors if monitoring determines there is diminished light intensity from the at least one LED;
    receiving a message from an optically enabled device by at least one of a plurality of luminaire associates after the at least one luminaire associate has sent a clear-to-send signal; and
    transporting the received message through a street lighting communication network to an intended recipient, wherein timing of the clear-to-send signal is based on a master timing signal broadcast through the optical signaling network or based upon a time slot that is allocated using a GPS receiver comprised in the at least one luminaire associate.

2. The method of claim 1 wherein the at least one other optical device is another of the street lights.

3. The method of claim 1 wherein the at least one other optical device is a mobile device.

4. The method of claim 1 wherein adjusting further comprises increasing the power of the at least one LED or decreasing the signaling rate.

5. The method of claim 1 further comprising:
    covering the optical receiving aperture with a polarizing filter; and rotating the polarizing filter to block passage of interfering light.

6. The method of claim 1 wherein varying further comprises allowing adequate functioning by employing a protocol that functions according to a parameter related to delivery goals.

7. The method of claim 6 wherein the protocol employs at least one of the following techniques: clock recovery, absence of a DC component, Manchester Coding, or Differential Manchester Encoding.

8. The method of claim 1 wherein receiving further comprises forming at least one optical link comprised in the optical signaling network and using the at least one optical link to assess a condition of the luminaire by employing a protocol for handling an acceptance, a transport, and a delivery of messages and controls throughout the network.

* * * * *